US007069144B2

United States Patent
Yoshihara et al.

(10) Patent No.: US 7,069,144 B2
(45) Date of Patent: Jun. 27, 2006

(54) PATH PREDICTING METHOD FOR CONTENTS DELIVERY APPARATUS

(75) Inventors: Kiyohito Yoshihara, Saitama (JP); Shinji Motegi, Saitama (JP); Hiroki Horiuchi, Saitama (JP); Masayuki Fujise, Tokyo (JP); Fumihide Kojima, Tokyo (JP); Katsuyoshi Sato, Tokyo (JP)

(73) Assignees: KDDI Corporation, Tokyo (JP); Communications Research Laboratory Independent Administrative Institution, Tokyo (JP)

( * ) Notice: Subject to any disclaimer, the term of this patent is extended or adjusted under 35 U.S.C. 154(b) by 282 days.

(21) Appl. No.: 10/699,000

(22) Filed: Nov. 4, 2003

(65) Prior Publication Data

US 2004/0143386 A1  Jul. 22, 2004

(30) Foreign Application Priority Data

Nov. 6, 2002  (JP) .............................. 2002-322490

(51) Int. Cl.
*G01C 21/34* (2006.01)
(52) U.S. Cl. .................. 701/202; 701/209; 340/995.19
(58) Field of Classification Search ................ 701/200, 701/201, 202, 209, 210; 340/995.19, 995.21
See application file for complete search history.

(56) References Cited

U.S. PATENT DOCUMENTS

| 6,456,234 | B1* | 9/2002 | Johnson ................. 342/357.09 |
| 6,711,474 | B1* | 3/2004 | Treyz et al. .................... 701/1 |
| 2003/0198346 | A1* | 10/2003 | Meifu et al. ................. 380/258 |
| 2004/0148638 | A1* | 7/2004 | Weisman et al. ........... 725/115 |
| 2005/0144049 | A1* | 6/2005 | Kuzunuki et al. ............. 705/6 |
| 2005/0197906 | A1* | 9/2005 | Kindig et al. ................. 705/15 |
| 2005/0216184 | A1* | 9/2005 | Ehlers ......................... 701/200 |

FOREIGN PATENT DOCUMENTS

| JP | 11-272711 | 10/1999 |
| JP | 2003-134545 | 5/2003 |

* cited by examiner

*Primary Examiner*—Gary Chin
(74) *Attorney, Agent, or Firm*—Westerman, Hattori, Daniels & Adrian, LLP.

(57) ABSTRACT

The present invention is directed to improve convenience to the user. A path extending from the present location S of a mobile terminal to a destination D via a base station is calculated (S2), distances between base stations on the calculated path and the present location are calculated, and the closest base station is determined as a contents delivery base station (S7). Grace time for the mobile terminal to pass through the contents delivery base station is calculated. Then, scheduled time to deliver the contents to the mobile terminal is calculated (S8). While monitoring a travel state of the mobile terminal (S10 to S12), the contents are delivered to the mobile terminal near the contents delivery base station (S14).

14 Claims, 7 Drawing Sheets

PATH PREDICTING METHOD FOR CONTENTS DELIVERY APPARATUS

BACKGROUND OF THE INVENTION

1. Field of the Invention

The present invention relates to a path predicting method for a contents delivery apparatus and, more particularly, to a path predicting method for a contents delivery apparatus for delivering contents such as music and a movie which is preliminarily reserved, for a mobile terminal of which geometric position changes as the user or vehicle travels, such as a portable telephone, a PDA (Personal Digital Assistant), an on-vehicle device, or the like.

2. Description of the Related Art

Hitherto, a contents delivery system for delivering contents such as music and a movie which is preliminarily reserved, for a mobile terminal of which geometric position changes as the user or vehicle travels, such as a portable telephone, a PDA (Personal Digital Assistant), an on-vehicle device, or the like has been being examined. By the system, the user can receive reserved contents even away from home and view the contents at appropriate time.

Japanese Patent Laid-open Publication (Heisei) 11-272711 discloses a system for accepting a contents acquisition order from the user in advance as a reservation, temporarily storing the ordered contents in a contents storage provided in a position on a network having little transmission delay from a user terminal and, after that, delivering the contents in a lump to the user terminal.

In the system proposed, the user designates the identifier of contents and time and place to receive the contents in the contents acquisition order made in advance as a reservation. At the designated time, the contents temporarily stored in any of contents storages which are spread geometrically is delivered to the user terminal via a radio base station installed in the designated place such as a service area. Even if the user cannot reach the designated place at the designated time due to traffic jam or the like and cannot receive the contents, the system attempts to supply the contents by transferring the contents to a contents storage which is located near the current position of the user terminal and can deliver the contents.

In the system, contents storages are disposed so as to be spread geometrically and contents is temporarily stored in a contents storage close to the user, and is delivered via a radio base station. Consequently, time required to deliver contents can be shortened.

The applicant herein has also proposed "Contents distribution method to mobile terminal and its center system" (Japanese Patent Application 2001-323625) capable of efficiently delivering contents from the most suitable contents storage to the user without preliminary designation of time and place to receive contents.

Figure 8:
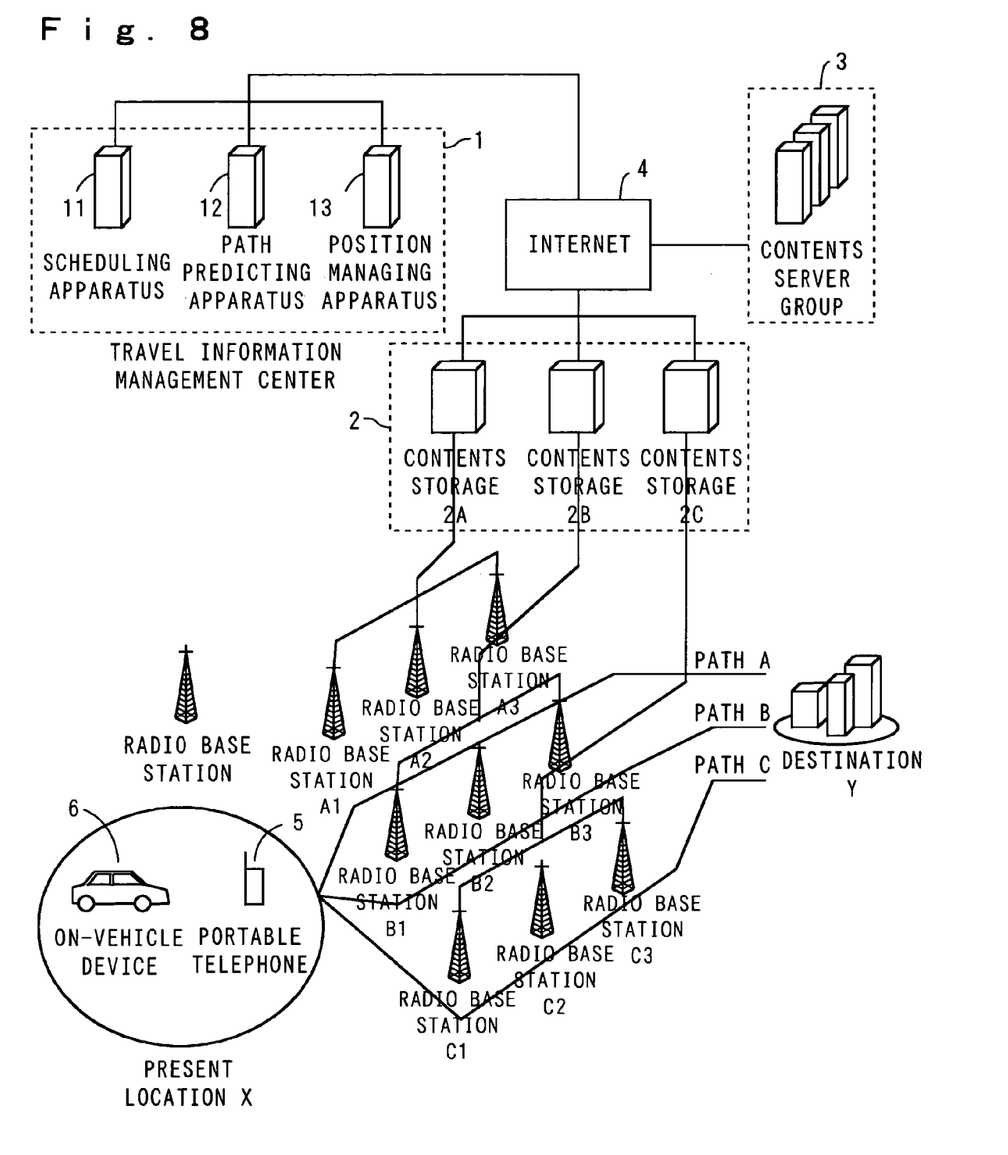
FIG. 8 is a configuration diagram showing an outline of a contents delivery system of the prior art and the present invention.

FIG. 8 is a configuration diagram showing an outline of the system proposed before. A travel information management center 1, a contents distribution center 2, and a contents server group 3 are connected to each other via the Internet 4. The travel information management center 1 has a scheduling apparatus 11, a path predicting apparatus 12, and a position managing apparatus 13. The contents distribution center 2 has contents storages 2A to 2C. The contents storages 2A to 2C obtain and store contents and distribute the contents to terminals near paths A, B, and C by using radio base stations A1 to A3, B1 to B3, and C1 to C3, respectively.

A mobile terminal such as a portable telephone 5 or an on-vehicle device 6 performs communication with the scheduling apparatus 11 of the travel information management center 1 via the radio base station and designates a present location X of itself, a destination Y, and the identifier of contents requested. The scheduling apparatus 11 requests the path predicting apparatus 12 to predict a plurality of paths from the present location X of the mobile terminal to the destination Y.

The path predicting apparatus 12 holds map information, traffic information, and the like and predicts travel paths of the user from the held information, present location X, and destination Y. In FIG. 8, a case where three paths A to C are predicted by the path predicting apparatus 12 is assumed.

In the case where contents of the designated identifier is not stored in any of the contents storages 2A to 2C corresponding to the paths A to C, the contents of the identifier is transferred from the contents server group 3 and stored into the contents storages 2A to 2C via the Internet 4.

The scheduling apparatus 11 obtains the position of the mobile terminal from the position managing apparatus 13. When the mobile terminal exists in a range to which the contents can be delivered from at least one radio base station, the contents is actually delivered. When the mobile terminal does not exist in the range to which the contents can be delivered, path prediction is re-tried and the contents is transferred to a contents storage on a path obtained as a result of the re-try. After that, the position of the mobile terminal is obtained again from the position managing apparatus 13, and processes similar to the above are repeated.

Position information obtained by a GPS or the like in the mobile terminal is periodically transmitted from the mobile terminal to the position managing apparatus or the radio base station used for communication by the mobile terminal is notified to the position managing apparatus 13. On the basis of the information, the position managing apparatus 13 calculates the position of the mobile terminal, thereby obtaining the position thereof.

As described above, the system in which the path predicting apparatus 12 is introduced predicts a path between the present location of the mobile terminal and the designated destination and delivers contents from a contents storage corresponding to the predicted path via a radio base station on the path. Since only the contents identifier and destination are sufficient as items to be designated necessary for downloading contents, the convenience to the user can be improved.

However, in the system proposed in the Japanese Patent Laid-open Publication (Heisei) 11-272711, the user has to designate not only the identifier of contents but also time and place to receive contents in advance. The system has a problem of lack of convenience to the user.

The problem is solved by the system proposed before by the applicant herein. The path predicting method has, concretely, the following steps:

(1) The scheduling apparatus 11 requests the path predicting apparatus 12 to predict a travel path of the mobile terminal. At the time of the request, the scheduling apparatus 11 notifies the path predicting apparatus 12 of identification information of the mobile terminal and the destination of the user.

(2) The path predicting apparatus 12 requests the position managing apparatus 13 for the position information of the mobile terminal.

(3) The position managing apparatus 13 calculates the travel direction and travel speed of the mobile terminal from fluctuations in the position information of the mobile terminal and notifies the path predicting apparatus 12 of the position information, travel direction, and travel speed of the mobile terminal.

(4) The path predicting apparatus 12 predicts a travel path of the user on the basis of the information such as map information and traffic information, the position information of the mobile terminal, and position information of the destination of the user. Concretely, the path predicting apparatus 12 predicts a path which can be used on the basis of the destination and the travel direction and speed of the user. When traffic jam occurs in the predicted path, the path predicting apparatus 12 adds a bypass for the case where the user avoids the traffic jam as a predicted path. The path predicting apparatus 12 has position information of the contents storages and position information of a radio base station group used by the contents storages, selects a contents storage having a radio base station group capable of performing excellent communication with a mobile terminal on the predicted path, and sends a notification to the scheduling apparatus 11. In the method, travel time of the mobile terminal on the path predicted by the path predicting apparatus 12 is not considered.

Consequently, for example, a problem occurs such that even a radio base station is on the predicted travel path, in the case such that there is no sufficient time for storing contents to a content storage, the contents from the radio base station cannot be delivered. There is also a problem such that scheduling management is insufficient when a number of mobile terminals designate acquisition of contents.

SUMMARY OF THE INVENTION

The present invention is achieved to solve the problems by further developing the proposed techniques and its object is to provide a path predicting method for a contents delivery apparatus capable of improving convenience to the user by making only the identifier of contents and a destination sufficient as items to be designated necessary for obtaining contents and delivering reserved contents with reliability.

In order to accomplish the object, a feature of the present invention resides in that a path predicting method for a contents delivery apparatus for temporarily storing contents which is preliminarily reserved into a contents storage and delivering the contents from a radio base station to a mobile terminal of which geometric position changes comprises a first step of calculating a plurality of paths each extending from a start point as a present location to a finish point as a destination via a radio base station, a second step of selecting a radio base station which is on the calculated path and is determined as a contents delivery base station, a third step of calculating grace time for the mobile terminal to pass through the contents delivery base station and calculating scheduled time to deliver the reserved contents to the mobile terminal, and a fourth step of determining whether the mobile terminal is off the path to the contents delivery base station or not, wherein the first to third steps are executed recursively in accordance with the determination in the fourth step, and contents is delivered to the mobile terminal via the contents delivery base station in accordance with results obtained in the second and third steps.

Also, in the present invention, it is desirable that the first step includes a fifth step of identifying base stations in a circle including the start point and the finish point.

Also, in the present invention, it is desirable that the first step further includes a sixth step of selecting a predetermined number of paths in order from a shortest path extending via the base station identified by the fifth step.

Also, in the present invention, it is desirable that in the first step, a path extending via a plurality of radio base stations is calculated as a plurality of paths each extending from the start point to the finish point via each of the radio base stations.

Also, in the present invention, it is desirable that in the first step, a path extending via a plurality of radio base stations is calculated as one path extending from the start point to the finish point via the plurality of radio base stations.

Also, in the present invention, it is desirable that in the second step, a radio base station which is on the calculated path and of which distance from the start point is the shortest is selected as a contents delivery base station.

Also, in the present invention, it is desirable that in the third step, an average speed on an ordinary road and one on a highway which are prepared are used.

Also, in the present invention, it is desirable that in the third step, a travel speed of the mobile terminal which is calculated on the basis of actual travel information of the mobile terminal is also used.

Also, in the present invention, it is desirable that in the third step, traffic information is used.

Also, in the present invention, it is desirable that in the fourth step, whether the mobile terminal is off the path or not is determined on the basis of a present location of the mobile terminal and a distance to the contents delivery base station.

Also, in the present invention, it is desirable that in the fourth step, when the present position of the mobile terminal and the distance to the contents delivery base station exceed allowable values, and the state continues longer than allowable time, it is determined that the mobile terminal is off the path.

Also, in the present invention, it is desirable that in the fourth step, when the mobile terminal does not pass through the contents delivery base station even after lapse of predetermined time since the scheduled time calculated in the third step, it is regarded that the mobile terminal is off the path to the contents delivery base station.

Also, in the present invention, it is desirable that the method further comprises a seventh step of, when the distance between the contents delivery base station and the mobile terminal becomes equal to or less than a predetermined value, delivering the contents temporarily stored in the contents storage to the mobile terminal via the contents delivery base station.

Further, in the present invention, it is desirable that the method further comprises an eighth step of delivering the contents temporarily stored in the contents storage to the mobile terminal via the contents delivery base station by polling between the contents delivery base station and the mobile terminal.

According to the present invention, only the identifier of contents and a destination are sufficient as items to be designated necessary for obtaining contents, so that convenience to the user is improved. Grace time until a mobile terminal passes through a contents delivery base station is calculated while monitoring the position of the mobile terminal, scheduled time to deliver the reserved contents to the mobile terminal is calculated and, in accordance with the result, the contents is stored in a contents storage. In such a manner, the content is delivered to the mobile terminal via the contents delivery base station. Thus, reserved contents can be delivered to a mobile terminal with reliability.

DETAILED DESCRIPTION OF THE PREFERRED EMBODIMENT

The present invention will be described in detail hereinbelow with reference to the drawings. Since the schematic configuration of a contents delivery system in the present invention is similar to that of FIG. 8, description will be given while referring to FIG. 8.

Figure 1:
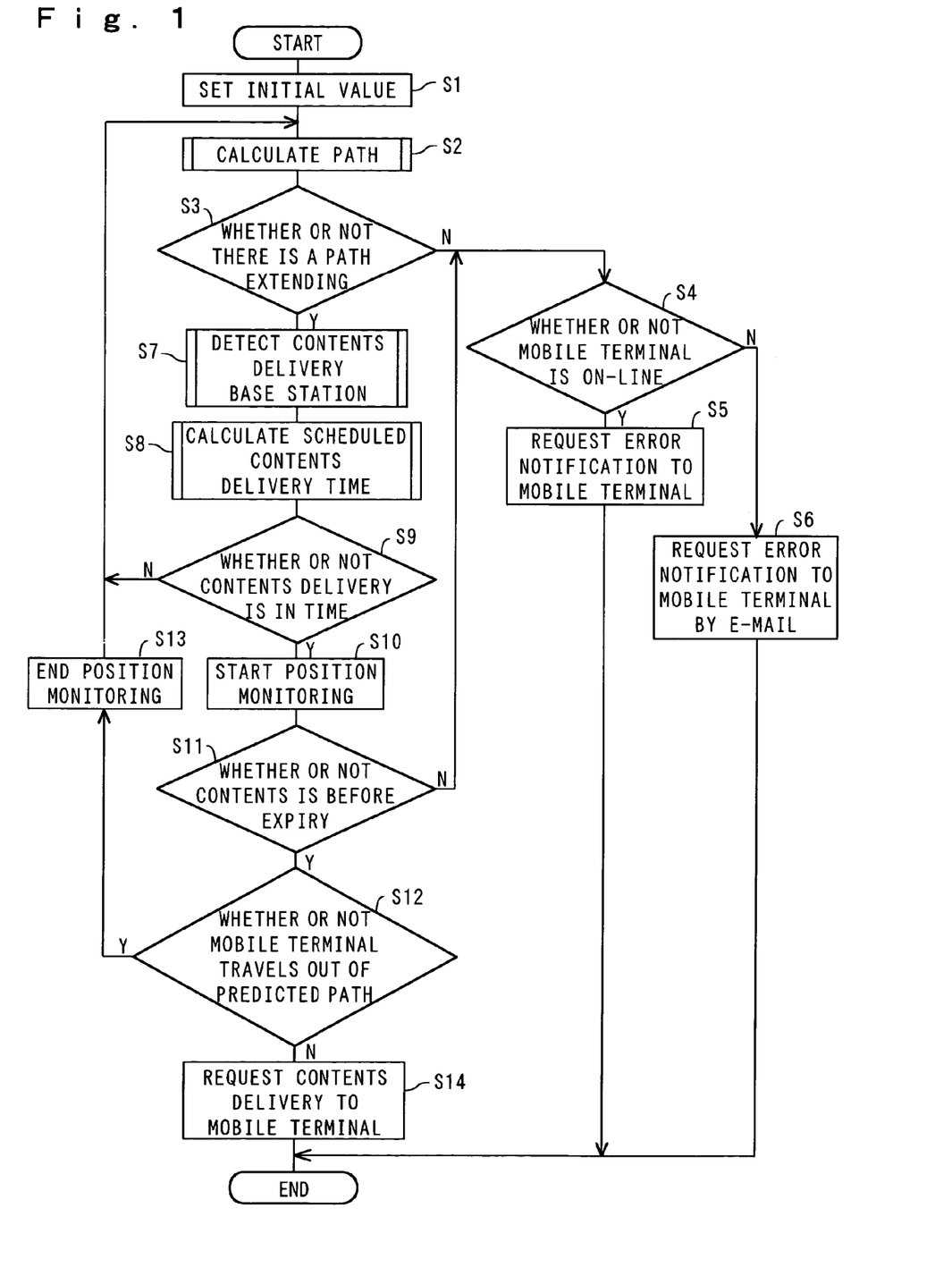
FIG. 1 is a flowchart showing an outline of a whole process in an embodiment of the present invention.

FIG. 1 is a flowchart showing an outline of a whole process in an embodiment of a path predicting method in a contents delivery apparatus according to the present invention. First, an outline of the whole process will be described in accordance with the flowchart of FIG. 1 and, after that, the details of each step will be described.

Outline of Whole Path Predicting Process (FIGS. 1 and 8)

First, the following initial values (inputs 1 to 12) necessary for path prediction are input (S1). A start point S is the present location of the mobile terminal. The start point S is obtained in such a manner that position information obtained by a GPS or the like in the mobile terminal is transmitted to the position managing apparatus 13 or the position managing apparatus 13 is notified of a base station used for communication by the mobile terminal and, on the basis of the information, the position managing apparatus 13 calculates the start point S. A finish point D (input 2) is a destination of the user and is input from the mobile terminal when the contents is reserved.

(1) Initial Values Used for the Path Calculating Process

Input 1 start point S

Input 2 finish point D

Input 3 the number N of base station identifying times (positive integer)

Input 4 range magnification S (positive decimal)

Input 5 the maximum number R of selection paths (positive integer)

Input 6 base station list L (list constructed by sets each consisting of latitude and longitude)

(2) Initial Values Used for Contents Delivery Base Station Selecting Process

Input 6 base station list L (list constructed by sets each consisting of latitude and longitude)

(3) Initial values used for the scheduled contents delivery time calculating process Input 7 average speed on ordinary road V1 (unit: km/h (positive integer))

Input 8 average speed on highway V2 (unit: km/h (positive integer))

(4) Initial Values Used for the Position Monitoring Process

Input 9 Position monitoring cycle Tmon (unit: second (positive integer))

Input 10 designation expiry Exp (unit: date and time (yyyy-mm-dd hh:mm))

Input 11 allowable radius Rin (unit: m (positive integer))

Input 12 off-path allowable time Tout (unit: minute (positive integer))

By the path predicting apparatus 12, a path extending from the start point S to the finish point D via a base station is calculated by using the start point S (input 1), the finish point D (input 2), and the like. In the calculation of a path (S2), inputs 3 to 6 are also used. The details of the process will be described later.

Subsequent to S2, whether there is a path extending from the start point S to the finish point D via a base station or not is checked (S3). When it is determined that there is no such a path, since contents cannot be delivered to the mobile terminal, whether the mobile terminal is on-line connected to the travel information management center 1 or not is checked (S4).

When it is determined as a result of the check that the mobile terminal is on-line connected, the path predicting apparatus 12 requests the scheduling apparatus 11 to notify the mobile terminal of an error (S5). When it is determined that the mobile terminal is not on-line connected, an error is notified to the mobile terminal asynchronously by an e-mail or the like (S6). In such a manner, the scheduling apparatus 11 notifies the mobile terminal of an error in the on-line fashion or asynchronously.

In the case where it is determined in step S3 that at least one path extending from the start point S to the finish point D via a base station exists, the position managing apparatus 13 refers to the base station list (list constructed by sets each consisting of latitude and longitude: input 6) and selects a base station serving as a contents delivery base station from the base stations on the path (S7). The details of the process of the contents delivery base station selection (S7) will be described later.

Subsequently, the position managing apparatus 13 calculates grace time of the mobile terminal to pass the selected contents delivery base station by using the average speed on an ordinary road (input 7) and the one on a highway (input 8) and calculates scheduled time to deliver contents to the mobile terminal from the calculated grace time and the present time (S8). The details of the process of the scheduled contents delivery time calculation (S8) will be described later.

Whether contents can be delivered before the calculated grace time or not is checked (S9). When it is determined that the contents cannot be delivered via the contents delivery station for such a reason that the calculated grace time is short and contents cannot be transmitted from the contents server group 3 and stored into a contents storage corresponding to the contents delivery base station within the grace time, the program returns to S2 and the path calculating process and subsequent process are repeated. In the case where the grace time calculated in step S8 is long and it is determined that the contents can be delivered from the contents delivery base station, monitoring of the position of the mobile terminal is started in the position monitoring cycle (input 9) (S10).

During the monitoring of the position of the mobile terminal, whether the designation of the contents is before the designation expiry (input 10) or not is checked (S11). When it is determined that the designation is not before the designation expiry, the contents is not delivered, so that an error is notified to the mobile terminal. Concretely, whether the mobile terminal is on-line connected to the travel information management center 1 or not is checked by the S4 to S6 (S4). When it is determined that the mobile terminal is on-line connected to the travel information management center 1, the position managing apparatus 13 requests the scheduling apparatus 11 to notify the mobile terminal of an error (S5). When it is determined that the mobile terminal is not on-line connected, the position managing apparatus 13 requests the scheduling apparatus 11 to notify the mobile terminal of the error asynchronously by an e-mail or the like (S6).

The position managing apparatus 13 checks whether or not the mobile terminal travels out of the predicted path during the monitoring of the position of the mobile terminal (S12). In the case where the mobile terminal exists on the outside of the allowable radius (input 11) continuously for the off-path allowable time (input 12), it is determined that the mobile terminal travels out of the predicted path. In the case where it is determined that the mobile terminal travels out of the predicted path, the position monitoring is temporarily finished (S13). The program returns to S2 and the path calculation and subsequent processes are repeated.

When it is determined in S12 that the mobile terminal travels without deviating from the predicted path, the position managing apparatus 13 notifies the scheduling apparatus 11 of the fact. At the time point when the contents delivery becomes possible, the scheduling apparatus 11 which has received the notification requests a corresponding contents storage to deliver contents to the mobile terminal (S14). The details of the position monitoring processes (S10 to S14) up to the delivery of the contents to the mobile station will be also described later.

Figure 2:
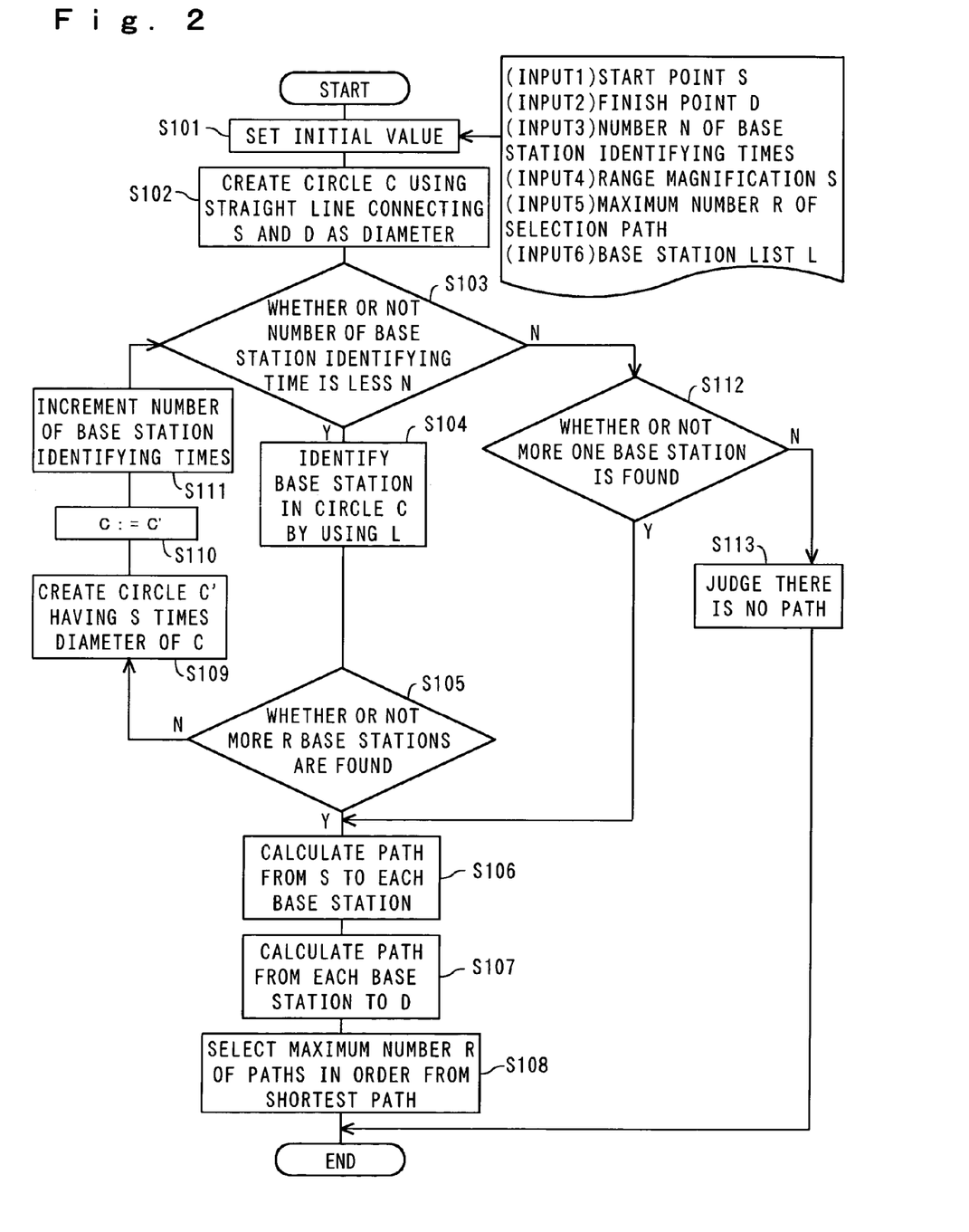
FIG. 2 is a flowchart showing an example of a path calculating process in the present invention.
Figure 3:
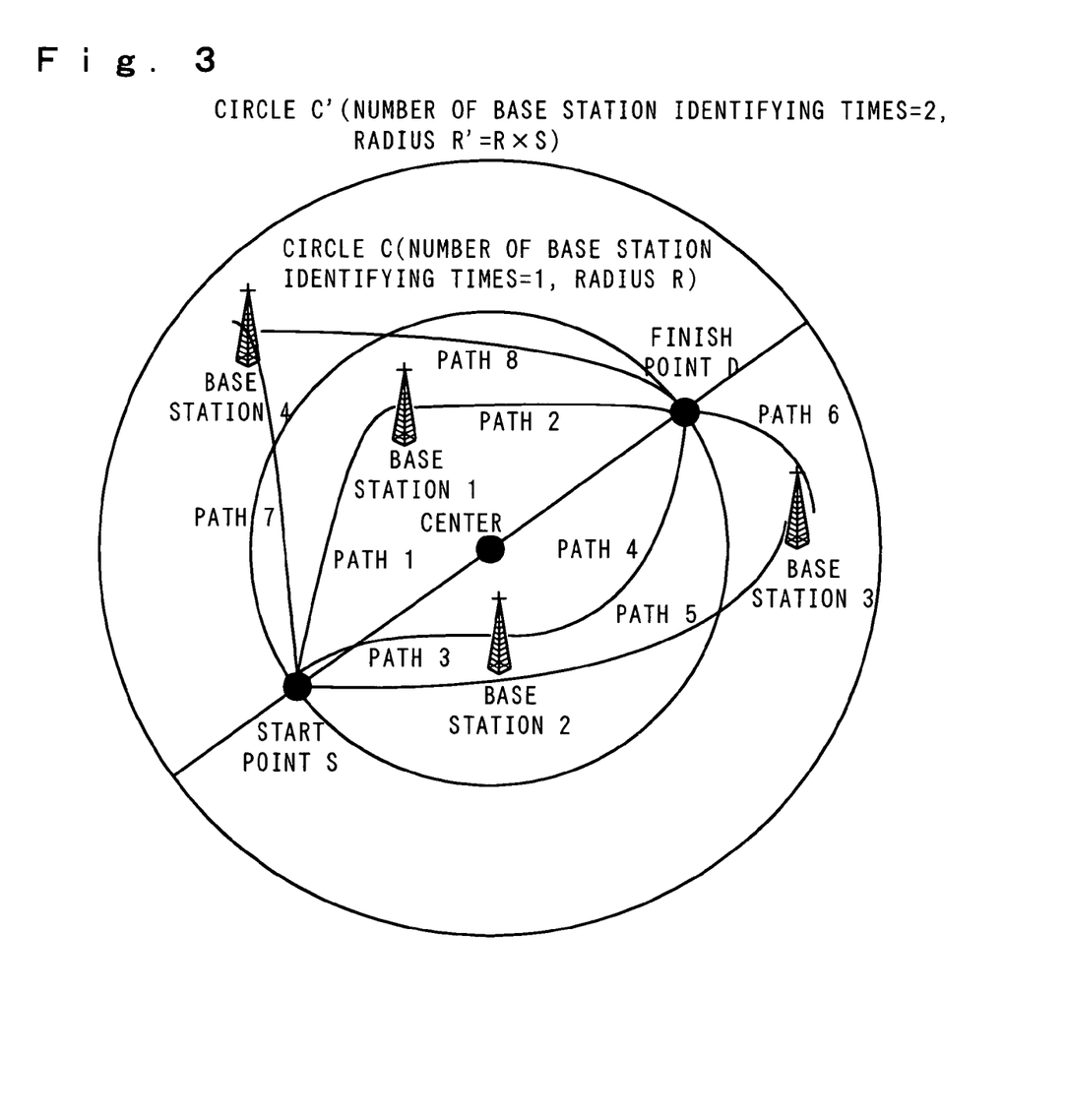
FIG. 3 is a diagram illustrating a concrete example of the path calculating process according to the present invention.

Path Calculating Process (FIGS. 2 and 3)

The path calculating process (S2) in FIG. 1 will now be described in detail. FIG. 2 is a flowchart showing an example of the process of path calculation (S2). In the process of path calculation (S2), the six inputs 1to 6 out of the initial values input in S1 in FIG. 1 are used as initial values (S101), and the maximum number R or less of paths each extending from the start point S to the finish point D via a base station are calculated.

For the calculation, first, a circle C using a straight line connecting the start point S and the finish point D as a diameter is created (S102). Next, whether the number of base station identifying times is N or less is checked (S103). Since the number of base station identifying times is 1 in the beginning, which is not greater than, base stations in the circle C are identified by using the base station list L (S104).

Whether R or more base stations have been found in the circle C or not is checked (S105). In the case where it is determined that R or more base stations have been found, paths extending from the start point S to each of the base stations and paths extending from the base stations to the finish points D are calculated by using a shortest-path calculating algorithm such as Dijkstra or the like (S106 and S107). From the paths, the maximum number R of paths is selected in order from a path whose distance from the start point S to the finish point D is shortest, and the process is finished (S108).

In the case where it is determined in S105 that R or more base stations are not found in the circle C, a circle C' obtained by increasing the diameter of the circle C by S times is newly created (S109), and the circle C is updated to the circle C' (S110). At this time, the number of base station identifying times is incremented (S111). When the processes of the loop of S103 to S111 are repeatedly executed and it is determined that R or more base stations are found in the circle which is sequentially enlarged, the program moves to the process of S106 and subsequent processes at that time point.

When it is determined that R or more base stations are not found in the circle when the number of base station identifying times becomes N, in S103, at the time point when the number of base station identifying times exceeds N, the program moves to the process of S112, and a check is made to see whether one or more base stations have been found in the circle or not in the base station identifying process until then (S112).

In the case where it is determined that one or more base stations have been found, the paths extending from the start point S to the base stations and the paths extending from the base stations to the finish point D are calculated (S106 and S107). All of paths each having less than R base stations are selected and the process is finished.

In the case where it is determined in S112 that no base station has been found, it is determined that a path extending from the start point S to the finish point D via a base station does not exist (S113), and the process is finished.

FIG. 3 shows a concrete example of the path calculating process. In the example, it is assumed that the maximum number R of selection paths is 3. First, the circle C obtained by using a straight line connecting the start point S and the finish point D as a diameter is created. When two base stations 1 and 2 exist in the circle C, the determination in S105 becomes false. Therefore, the circle C' obtained by increasing the diameter by S times is newly created, the number of base station identifying times is incremented, and base stations existing in the circle C' are identified.

In the newly created circle C', in addition to the base stations 1 and 2 already identified, base stations 3 and 4 exist, so that the determination in S105 becomes true. Paths from the start point S to the base stations, concretely, the paths 1, 3, 5, and 7 are calculated. Subsequently, paths from the base stations to the finish point D, concretely, paths 2, 4, 6, and 8 are calculated. In the example, four paths each extending from the start point S to the finish point D via a base station are calculated. Three paths having the shorter distances from the start point S to the finish point D, for example, the paths extending via the base stations 1, 2, and 3 are selected and the process is finished.

Although not shown in FIG. 3, for example, when the distance between the start point S and the finish point D is too short, the circle is small. As a result, there is a case that no base station is always found in the circle. In this case, it is sufficient to determine that there is no path extending from the start point S to the finish point D via a base station and finish the process.

Figure 4:
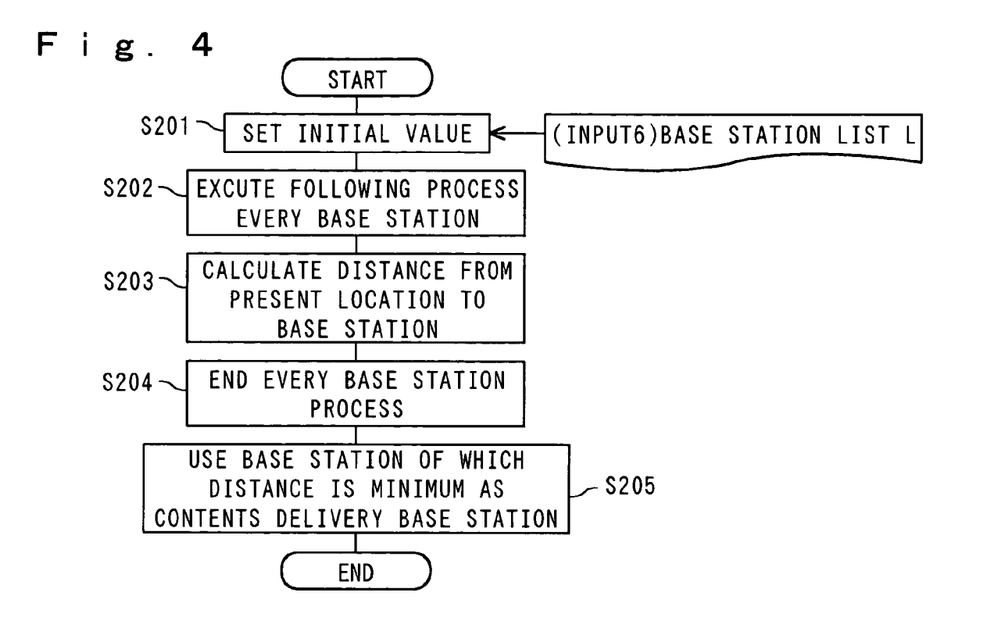
FIG. 4 is a flowchart showing an example of a contents delivery base station selecting process in the present invention.
Figure 5:
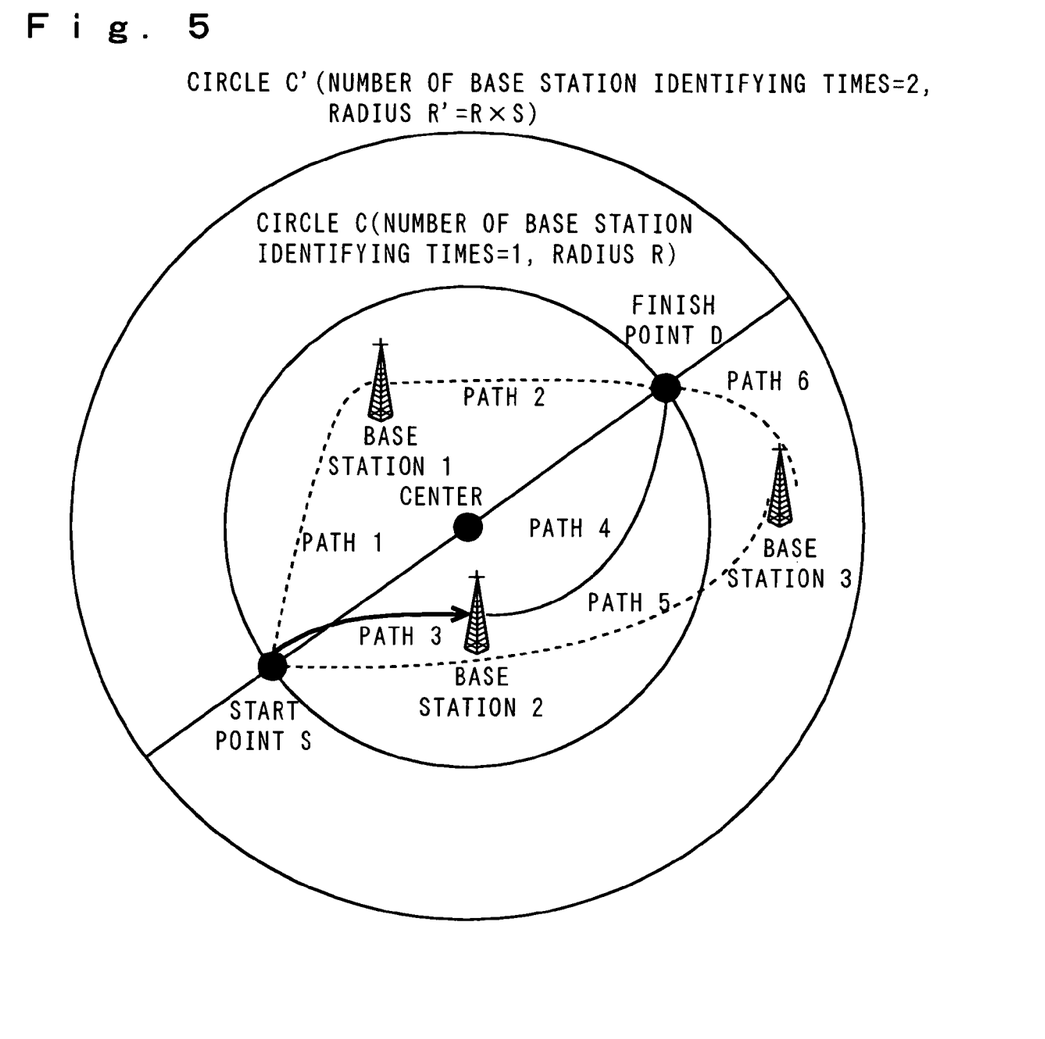
FIG. 5 is a diagram illustrating a concrete example of the contents delivery base station selecting process in the present invention.

Contents Delivery Base Station Selecting Process (FIGS. 4 and 5)

The contents delivery base station selection (S7) in FIG. 1 will now be described in detail. FIG. 4 is a flowchart showing an example of the contents delivery base station selection (S7). In the contents delivery base station selection (S7), one (input 6) of the initial values which is input in S1 in FIG. 1 is used as an initial value (S201), and a radio base station which is on the path calculated by the path calculating process and has the shortest distance from the start point S is selected.

For the selection, a distance from the present location of the mobile terminal to the base station calculated by the calculation of the path is obtained (S203) This calculation is executed for each of the base stations (S202 and S204). As the distance, a distance obtained in the path calculating process (S106) can be used.

Subsequently, the base station of which distance calculated in S203 is the minimum is used as the contents delivery base station (S205) and the process is finished. Unless contents can be temporarily stored into a contents storage by the time calculated by the scheduled contents delivery time calculating process which will be described later or the mobile terminal is deviated from the predicted path, the contents is basically delivered from the base station selected.

FIG. 5 shows a concrete example of selection of the contents delivery base station. In the example, subsequent to the path calculating process, distances from the start point S as the present location to the base stations 1, 2, and 3 are calculated. As a result of the calculation, it is found that the distance between the start point S and the base station 2 is the shortest. The base station 2 is determined as a contents delivery base station.

Figure 6:
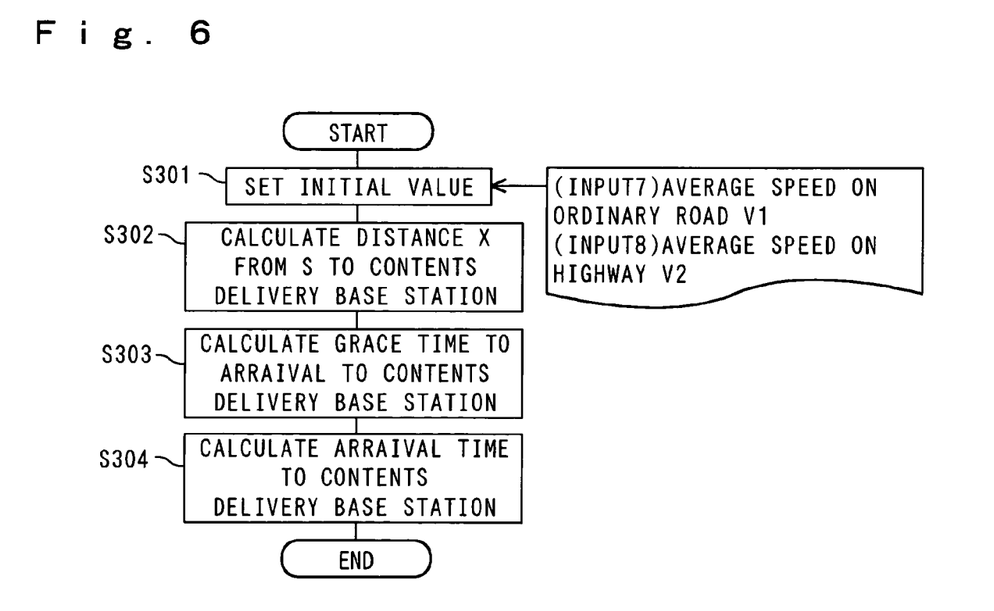
FIG. 6 is a flowchart showing an example of a scheduled contents delivery time calculating process in the present invention.

Contents Delivery Scheduled Time Calculating Process (FIG. 6)

The process of the scheduled contents delivery time calculation (S8) in FIG. 1 will now be described in detail. FIG. 6 is a flowchart showing an example of the process of the scheduled contents delivery time calculation (S8). In the process of the scheduled contents delivery time calculation (S8), two inputs (inputs 7 and 8) out of the initial values input in S1 in FIG. 1 are used as initial values (S301), and arrival schedule time to the contents delivery base station selected by the contents delivery base station selecting process is calculated.

For the calculation, first, the distance X from the start point S to the contents delivery base station is calculated (S302). As the distance X, the distance obtained in the path calculating process (S106) can be used. Subsequently, the grace time up to arrival to the contents delivery base station is calculated by X/V1 or X/V2 (S303). By giving an attribute such as an ordinary road or a highway to the path calculated by the path calculating process, as compared with the case of inputting a single average speed as an initial value, the grace time can be calculated more accurately.

Whether the road is an ordinary road or a highway can be determined by referring to the base station list L. It is sufficient to select V1 or V2 in accordance with the determination. Subsequently, by adding the calculated grace time to the present time, the scheduled arrival time to the contents delivery base station is calculated (S304) and the process is finished.

In the case where the reserved contents cannot be delivered from the contents delivery base station by the time calculated by the scheduled contents delivery time calculating process, according to the determination in S9 in FIG. 2, the contents delivery from the contents delivery base station scheduled based on the selection is given up. The path calculating process is executed again and an attempt is made to select a contents delivery base station having sufficient time to deliver contents.

By setting scheduled arrival time of the user to the contents delivery base station as the scheduled contents delivery time, schedule management in the scheduling apparatus 11 can be effectively performed. For example, in the case where contents acquisition is designated from a number of mobile terminals, the order of storing contents or the like can be set in accordance with the scheduled arrival time by storing contents from the contents server group 3 to the contents storage while giving priority to the contents for a mobile terminal of which the scheduled arrival time is close. Thus, service to the user can be improved. For example, when the mobile terminal does not pass through the contents delivery base station even after predetermined time elapses since the scheduled contents delivery time, it can be regarded that the mobile terminal is off the path to the contents delivery base station and the contents delivery base station selection can be started from the beginning.

Figure 7:
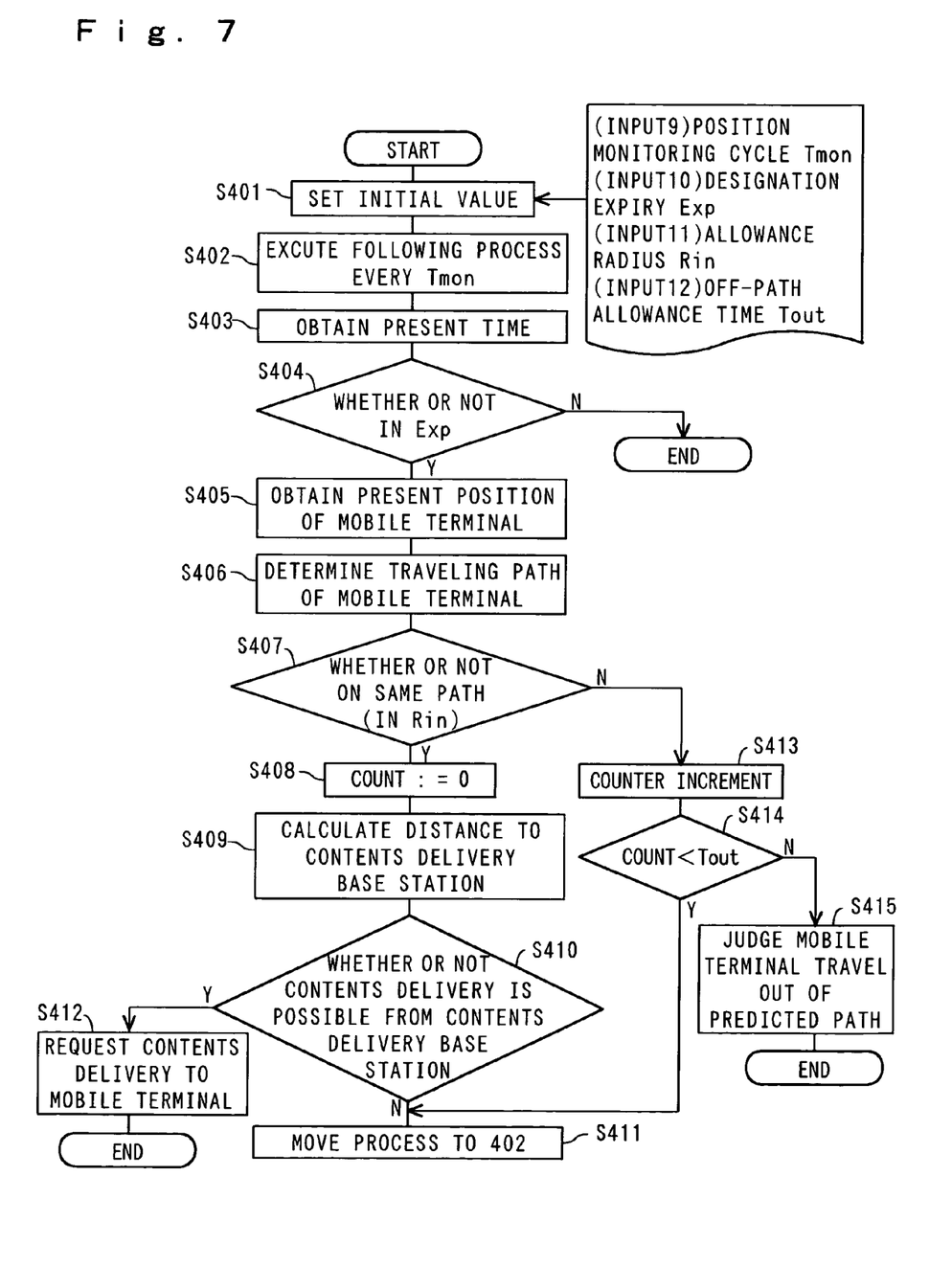
FIG. 7 is a flowchart showing an example of a position monitoring process in the present invention.

Position Monitoring Process (FIG. 7)

The process of position monitoring (S10 to S14) in FIG. 1 will now be described in detail. FIG. 7 is a flowchart showing an example of the process of position monitoring (S10 to S14). In the process of position monitoring (S10 to S14), four inputs (inputs 9 to 12) out of the initial values input in S1 in FIG. 1 are used as initial values (S401), the process of S403 and subsequent processes are repeated every position monitoring cycle Tmon (input 9) designated (S402) to check whether the mobile terminal travels on the predicted path or not.

First, the present time is obtained (S403) and whether the designation time as an object is before the designation expiry Exp which is set at the time of designation or not is checked (S404 and S11). In the case where it is determined that the designation is not before the expiry, the process is finished, the program moves to the process of S4 in FIG. 2, and an error is notified.

In the case where it is determined in S404 that the designation is before the expiry Exp, the present position of the mobile terminal is obtained (S405). The present position of the mobile terminal is obtained in such a manner that position information obtained by a GPS or the like in the mobile terminal is periodically transmitted from the mobile terminal to the position managing apparatus 13 or the radio base station used for communication by the mobile terminal is notified to the position managing apparatus 13 and, on the basis of the information, the position managing apparatus 13 calculates the present position.

Subsequently, a path to the contents delivery base station is determined from the paths selected by the path selecting process (S406). By comparing the determined path and the present location obtained in S405 with each other, whether the mobile terminal travels on the path or not is checked. The check can be made, concretely, by seeing whether or not the distance between the present location of the mobile terminal and the contents delivery base station is equal to or less than the allowable radius Rin (input 11) which is preliminarily input (S407,S12).

In the case where the present location of the mobile terminal is within Rin and it is determined that the mobile terminal travels on the path, the value of the counter is set to 0 (S408). Subsequently, the distance X to the contents delivery base station is calculated (S409). Whether the contents can be actually delivered from the contents delivery base station to the mobile terminal or not is checked on the basis of the distance X (S410).

When it is determined in S410 that contents can be actually delivered, the fact is notified from the position managing apparatus 13 to the scheduling apparatus 11. The scheduling apparatus 11 requests the contents storage to deliver contents to the mobile terminal (S412 and S14). When it is determined that the distance X is too long and the contents cannot be delivered, the program returns to S402 and the process in S402 and subsequent processes are executed again (S411).

In the case where it is determined in S407 that the present position of the mobile terminal is not within Rin, the value of the counter is incremented (S413) and whether or not the counter value exceeds the off-path allowable time Tout (input 12) which is preliminarily input is checked (S414). When it is determined that the counter value does not exceed the off-path allowable time Tout, the program returns to S402 and the process of S402 and subsequent processes are executed again (S411). The counter value and the off-path allowable time Tout (input 12) may be values corresponding to time.

In the case where it is determined in S414 that the counter value exceeds the off-path allowable time Tout, it is determined that the mobile terminal travels out of the predicted path (S415), the process is finished, and the program moves to the process of S13 in FIG. 1.

When the mobile terminal does not pass through the contents delivery base station after lapse of predetermined time since the scheduled contents delivery time, it can be regarded that the mobile terminal is off the path to the contents delivery base station and the program can move to the process of S13 in FIG. 1.

Although the embodiment has been described above, the present invention can be variously modified. For example, the path calculating process is not limited to the region in the circle but may be executed on a region of an oval or the like in which travel of the mobile terminal is expected. Selection paths of the number equal to or larger than R is not limited to the maximum number R. All of paths of R or larger found in S105 in FIG. 2 can be subjected to the following process.

When a plurality of base stations exist on the same path, for example, when not only the base station 1 but also the base station 2 exist on the path 2 in FIG. 3, in the foregoing embodiment, the process is performed by regarding that there are two paths; the path extending via the base station 1 and the path extending via the base station 2. The embodiment can be modified that the paths are processed as one path extending via the base stations 1 and 2 with reference to the base station list L.

In the contents delivery base station selecting process, a contents delivery terminal may be selected in consideration of the travel direction of the mobile terminal. All of base stations on paths calculated by the path calculating process can be used as contents delivery base stations. In this case, however, a copy of requested contents has to be stored in a plurality of contents storages. Consequently, as compared with the case of using one base station closest from the present location of the mobile terminal as the contents delivery base station, the capacity of the storage which has to be prepared in the contents storage increases.

In the foregoing embodiment, as understood from the flowchart of FIG. 1, only for the first time, the scheduled contents delivery time is an estimation obtained by using fixed values which are preliminarily input as initial values such as the inputs 7 and 8. Although fixed values may be used from the second time on, by estimating scheduled time from the latest average speed obtained in the position monitoring process from the second time on, as compared with the case of using fixed values, more accurate scheduled arrival time can be calculated. By preparing, as initial values, values such as an average speed of a pedestrian in addition to an average speed of a vehicle on an ordinary road and a highway, the present invention can be applied also to pedestrians. For example, by using traffic information such as VICS, more realistic scheduled arrival time can be calculated.

Further, in the position monitoring process, whether contents can be actually delivered from the contents delivery base station or not can be determined not only by the distance from the base station but also by polling the base station from the mobile terminal or polling the mobile terminal from the base station.

In the present invention, the present location of the mobile terminal has to be obtained by the position monitoring process. However, the present invention is not limited to the concrete methods of monitoring the position and the expression of positional information.

As described in detail above, according to the present invention, without designation of time and location to receive contents by the user, the position of the mobile terminal is dynamically traced by the travel information management center, and contents can be delivered from the most suitable contents storage at high speed with high reliability.

Particularly, the present invention is the technique useful to service of delivery contents to a portable terminal or an on-vehicle device on assumption of using a mobile network such as ITS (Intelligent Transport System) which is expected to be spread in future. The application range is extremely wide.

What is claimed is:

1. A path predicting method for a contents delivery apparatus for temporarily storing contents which is preliminarily reserved into a contents storage and delivering the contents from one of a plurality of radio base station to a mobile terminal of which geometric position changes, comprising:
    a first step of calculating a plurality of paths each extending from a start point as a present location to a finish point as a destination via one of the radio base stations;
    a second step of selecting a radio base station from one of the radio base stations which; is on the calculated path and is determined as a contents delivery base station;
    a third step of calculating grace time for the mobile terminal to pass through the contents delivery base station and calculating scheduled time to deliver the reserved contents to the mobile terminal based on the calculated grace time; and
    a fourth step of determining whether the mobile terminal is off the path to the contents delivery base station or not,
    wherein the first to third steps are executed recursively in accordance with the determination that the mobile terminal is off the path in the fourth step, otherwise, the contents are delivered to the mobile terminal via the contents delivery base station in accordance with results obtained in the second and third steps.

2. The path predicting method for a contents delivery apparatus according to claim 1, wherein the first step includes a fifth step of identifying the base stations in a circle including the start point and the finish point.

3. The path predicting method for a contents delivery apparatus according to claim 2, wherein the first step further includes a sixth step of selecting a predetermined number of paths in order from a shortest path extending via one of the identified base stations.

4. The path predicting method for a contents delivery apparatus according to claim 1, wherein in the first step, a path extending via the radio base stations is calculated as a plurality of paths each extending from the start point to the finish point via each of the radio base stations.

5. The path predicting method for a contents delivery apparatus according to claim 1, wherein in the first step, a path extending via the radio base stations is calculated as one path extending from the start point to the finish point via the radio base stations.

6. The path predicting method for a contents delivery apparatus according to claim 1, wherein in the second step, one of said radio base stations which is on the calculated path and of which distance from the start point is the shortest is selected as paid contents delivery base station.

7. The path predicting method for a contents delivery apparatus according to claim 1, wherein in the third step, an average speed on an ordinary road and one on a highway which are prepared are used to calculate said grace time.

8. The path predicting method for a contents delivery apparatus according to claim 7, wherein in the third step, a travelspeed of the mobile terminal which is calculated on the basis of actual travel information of the mobile terminal is also used to calculate said scheduled time.

9. The path predicting method for a contents delivery apparatus according to claim 1, wherein in the third step, traffic information is used to calculate said scheduled time.

10. The path predicting method for a contents delivery apparatus according to claim 1, wherein in the fourth step, whether the mobile terminal is off the path or not is determined on the basis of a present location of the mobile terminal and a distance to the contents delivery base station.

11. The path predicting method for a contents delivery apparatus according to claim 10, wherein in the fourth step, when the present position of the mobile terminal and the distance to the contents delivery base station exceed allowable values for longer than an allowable time, it is determined that the mobile terminal is off the path.

12. The path predicting method for a contents delivery apparatus according to claim 1, wherein in the fourth step, when the mobile terminal does not pass through the contents delivery base station even after lapse of predetermined time since the scheduled time calculated in the third step, it is regarded that the mobile terminal is off the path to the contents delivery base station.

13. The path predicting method for a contents delivery apparatus according to claim 1, further comprising a seventh step of, when the distance between the contents delivery base station and the mobile terminal becomes equal to or less than a predetermined value, delivering the contents temporarily stored in the contents storage to the mobile terminal via the contents delivery base station.

14. The path predicting method for a contents delivery apparatus according to claim 1, further comprising an eighth step of delivering the contents temporarily stored in the contents storage to the mobile terminal via the contents delivery base station by polling between the contents delivery base station and the mobile terminal.

* * * * *